United States Patent
Hamamoto et al.

(10) Patent No.: US 10,281,998 B2
(45) Date of Patent: May 7, 2019

(54) MARK DISPLAY UNIT FOR VEHICLE NAVIGATION

(71) Applicant: Furuno Electric Co., Ltd., Nishinomiya (JP)

(72) Inventors: Kentaroh Hamamoto, Osaka (JP); Akira Ninomiya, Kobe (JP); Masahiro Hashimura, Osaka (JP); Takashi Shimizu, Rimini (IT); Tomoya Fujisawa, Kobe (JP)

(73) Assignee: Furuno Electric Co., Ltd., Nishinomiya (JP)

(*) Notice: Subject to any disclaimer, the term of this patent is extended or adjusted under 35 U.S.C. 154(b) by 260 days.

(21) Appl. No.: 15/059,144

(22) Filed: Mar. 2, 2016

(65) Prior Publication Data
US 2016/0259431 A1  Sep. 8, 2016

(30) Foreign Application Priority Data

Mar. 4, 2015  (JP) ................. 2015-042195

(51) Int. Cl.
*G06F 3/0362* (2013.01)
*G01C 21/20* (2006.01)
(Continued)

(52) U.S. Cl.
CPC ......... *G06F 3/0362* (2013.01); *G01C 21/203* (2013.01); *G01C 21/3664* (2013.01);
(Continued)

(58) Field of Classification Search
CPC .............. G01C 21/3664; G01C 21/203; G01C 21/3679; G06F 3/0482; G06F 3/04842; G06F 3/0362
See application file for complete search history.

(56) References Cited

U.S. PATENT DOCUMENTS 5,964,821 A * 10/1999 Brunts ............... G01C 21/3611
                                                                 340/990
8,913,066 B2  12/2014 Okuda
(Continued)

FOREIGN PATENT DOCUMENTS

JP  H05288562 A  11/1993
JP  H0820267 B2  3/1996
(Continued)

OTHER PUBLICATIONS

European Patent Office, Extended European Search Report Issued in Application No. 16157818.2, dated Jul. 27, 2016, Germany, 8 pages.

*Primary Examiner* — Jennifer N To
*Assistant Examiner* — Amy P Hoang
(74) *Attorney, Agent, or Firm* — Alleman Hall Creasman & Tuttle LLP

(57) ABSTRACT

A mark display unit for vehicle navigation is provided, which displays marks on a display screen. The mark display unit includes a dial selector, with a push function, a push operation thereof being associated with selecting one of categories corresponding to the number of push operations, and a rotational operation thereof being associated with selecting one of items regarding a selected category corresponding to the rotational position, and a controller configured to display on the display screen one or more of the marks according to a combination of the number of push operations and the rotational position. As the selected item is switched among the items in association with the rotational operation, the controller displays one or more of the marks assigned with the selected item, by switching a display mode of each of the marks between displayed and non-displayed modes.

19 Claims, 11 Drawing Sheets

| MARK ID | LATITUDE | LONGITUDE | DATE AND TIME | FISH KIND | WATER TEMP. | COLOR | SHAPE | ... |
|---|---|---|---|---|---|---|---|---|
| 111 | 49.3 | 145.7 | 20140806-053543 | BONITO | 20°C | RED | ◇ | ... |
| 112 | 49.0 | 150.1 | 20140825-070123 | TUNA | 22°C | YELLOW | ○ | ... |
| 113 | 48.5 | 142.3 | 20140919-100102 | TUNA | 23°C | GREEN | △ | ... |
| 114 | 43.5 | 145.5 | 20140623-064912 | MARLIN | 18°C | PURPLE | ◇ | ... |
| 120 | 47.6 | 139.2 | 20141013-044320 | MARLIN | 15°C | BLUE | + | ... |
| 121 | 46.1 | 135.7 | 20150203-060944 | SALMON | 7°C | RED | ■ | ... |

(51) Int. Cl.
  *G01C 21/36* (2006.01)
  *G06F 3/0482* (2013.01)
  *G06F 3/0484* (2013.01)

(52) U.S. Cl.
  CPC ....... *G01C 21/3679* (2013.01); *G06F 3/0482* (2013.01); *G06F 3/04842* (2013.01)

(56) References Cited

U.S. PATENT DOCUMENTS

| | | | |
|---|---|---|---|
| 9,182,889 B1* | 11/2015 | Karlo | G06F 3/04817 |
| 9,389,758 B2 | 7/2016 | Wakabayashi et al. | |
| 9,453,740 B2 | 9/2016 | Nguyen | |
| 2006/0229807 A1* | 10/2006 | Sheha | G01C 21/3679 |
| | | | 701/468 |
| 2008/0312822 A1* | 12/2008 | Lucas | G01C 21/26 |
| | | | 701/465 |
| 2014/0365126 A1* | 12/2014 | Vulcano | G01C 21/36 |
| | | | 701/533 |

FOREIGN PATENT DOCUMENTS

| | | |
|---|---|---|
| JP | 2923252 B2 | 7/1999 |
| JP | 2001236772 A | 8/2001 |
| JP | 2005326209 A | 11/2005 |
| JP | 2007017269 A | 1/2007 |
| JP | 2012230588 A | 11/2012 |
| JP | WO2013153977 A1 | 10/2013 |
| WO | 2013005249 A1 | 1/2013 |
| WO | 2013153711 A1 | 10/2013 |

\* cited by examiner

| MARK ID | LATITUDE | LONGITUDE | DATE AND TIME | FISH KIND | WATER TEMP. | COLOR | SHAPE | ⋮ |
|---|---|---|---|---|---|---|---|---|
| 111 | 49.3 | 145.7 | 20140806-053543 | BONITO | 20°C | RED | ◇ | ⋮ |
| 112 | 49.0 | 150.1 | 20140825-070123 | TUNA | 22°C | YELLOW | ○ | ⋮ |
| 113 | 48.5 | 142.3 | 20140919-100102 | TUNA | 23°C | GREEN | △ | ⋮ |
| 114 | 43.5 | 145.5 | 20140623-064912 | MARLIN | 18°C | PURPLE | ◇ | |
| 120 | 47.6 | 139.2 | 20141013-044320 | MARLIN | 15°C | BLUE | + | ⋮ |
| 121 | 46.1 | 135.7 | 20150203-060944 | SALMON | 7°C | RED | ■ | ⋮ |

FIG. 3

MARK DISPLAY UNIT FOR VEHICLE NAVIGATION

CROSS-REFERENCE TO RELATED APPLICATION(S)

This application claims priority under 35 U.S.C. § 119 to Japanese Patent Application No. 2015-042195, which was filed on Mar. 4, 2015, the entire disclosure of which is hereby incorporated by reference.

TECHNICAL FIELD

This disclosure relates to a mark display unit for vehicle navigation.

BACKGROUND

Conventionally, mark display units for ship navigation, which display on a display screen a mark associated with a position, are known. JP1996-020267B and JP1993-288562A disclose this kind of mark display units for ship navigation.

The mark display unit for ship navigation of JP1996-020267B displays a mark associated with a position where various information (e.g., fishing data) is assigned, on a display screen along with a trace, so as to add information to an important location (e.g., fishing spot).

The ship trace display unit of JP1993-288562A designs multiple marks according to a purpose of use of the display unit, and displays the marks in various manners.

JP2923252B discloses a ship electronic instrument including a rotary indicator and a push button incorporated in the rotary indicator. Although JP2923252B does not refer to anything about displaying a mark, the ship electronic instrument of JP2923252B selects one of adjusting functions by the push button, and adjusts a to-be-adjusted amount corresponding to the selected adjusting function by the rotary indicator.

However, with each of the configurations of JP1996-020267B and JP1993-288562A, when the number of marks stored in the mark display unit for ship navigation is increased and a large amount of information of marks accumulates, a nautical chart, a radar image, a trace, etc. displayed on the display screen may be covered by the marks and cannot be seen, or the marks may be displayed densely and the individual marks may be difficult to visually be recognized. Therefore, there are rooms for improvements in these regards.

SUMMARY

The purpose of this disclosure relates to reducing, even when marks stored in a mark display unit for vehicle navigation are increased in number, a situation where a chart etc. displayed on a display screen are covered by the marks and cannot be seen, or a situation where the marks are displayed densely and the individual marks are difficult to visually be recognized, and thus to securing visibility and improving operability of the display screen of the mark display unit.

According to one aspect of the disclosure, a mark display unit for vehicle navigation is provided, which displays marks on a display screen, each of the marks associated with a geographical position. The mark display unit includes a dial selector with a push function, a push operation of the dial selector being associated with selecting one of a plurality of categories corresponding to the number of push operations, and a rotational operation of the dial selector being associated with selecting one of a plurality of items regarding a selected category corresponding to the rotational position of the dial selector, the plurality of categories and the plurality of items assigned to the marks, and a controller configured to display on the display screen one or more of the marks according to a combination of the number of push operations and the rotational position of the dial selector. The selected item is switched among the plurality of items in association with the rotational operation of the dial selector, and as the selected item is switched, the controller displays one or more of the marks assigned with the item selected by the dial selector, by switching a display mode of each of the marks between a displayed mode and a non-displayed mode, each of the one or more of the marks displayed at a corresponding position on the display screen.

With the above configuration, even when the marks stored in the mark display unit for vehicle navigation are increased in number, a situation where a chart etc. displayed on the display screen are covered by the marks and cannot be seen, or a situation where the marks are displayed densely and the individual marks are difficult to visually be recognized can be reduced. Thus, visibility of the display screen of the mark display unit can be secured. Further, a user can narrow down the marks in the manner of selection while looking at the narrowed-down marks change sequentially corresponding to the rotational operation of the dial selector, and therefore, high usability can be achieved and operability can be improved.

In a case where the one of the categories is selected again in association with latest push and rotational operations, the controller may display, on the display screen, one or more of the marks assigned with an item selected in association with immediately previous push and rotational operations for the one of the categories, without selecting the item again, each of the one or more of the marks displayed at a corresponding position on the display screen.

With the above configuration, in a case where the user selects the same category again, without selecting the item selected immediately previously once again, the displaying of only one or more of the marks assigned with the item selected immediately previously can be achieved at the corresponding position(s) on the display screen. Therefore, the operability can be improved.

The items from which one item is selected in association with the rotational operation of the dial selector may include an item that causes the controller to display all the marks assigned with the selected category.

With the above configuration, all the marks assigned with the selected category can be displayed without being narrowed down according to the situation, which increases convenience.

The controller may only display, on the display screen, one or more of the marks assigned with an item selected in a category currently selected, while the item is selected by the dial selector regardless of any items previously selected in categories other than the selected category, each of the one or more of the marks displayed at a corresponding position on the display screen.

With the above configuration, regardless of the item selected in another category selected immediately previously, only one or more of the marks assigned with the currently selected item is displayed. Thus the category used for narrowing down the marks can easily be switched. As a result, the operability can be improved.

The categories from which one category is selected in association with the push operation of the dial selector may include a category that causes the controller to display one or more of the marks matching a plurality of selected conditions.

With the above configuration, since the displaying of only one or more of the marks assigned with a plurality of items at the same time can be achieved, the composite narrowing-down operation of the displayed marks can be performed. Therefore, the marks are less likely displayed densely, which increases convenience.

The controller may display, on the display screen, a window in which one of the categories and one of the items that are currently selected are displayed and the rest of the categories and the rest of the items that are currently not selected are not displayed.

With the above configuration, since the window does not display the categories and items as lists, it does not occupy much space on the display screen. Therefore, the visibility of the display screen can sufficiently be secured.

The window may be displayed on the display screen along with one or more of the marks assigned with the one of the categories and the one of the items that are currently selected.

With the above configuration, the user can refer to information in the window while also referring to the marks displayed on the display screen.

While the categories and the items are selectable by the dial selector, the controller may display the window in a highlighted manner.

With the above configuration, the user can easily understand that the categories and the items are selectable in association with the operation of the dial selector in order to narrow down the marks. As a result, the operability can be improved.

When the categories and the items are unselectable, the categories and the items may become selectable in association with one of the push and rotational operations of the dial selector.

With the above configuration, by the user performing one of the push operation and the rotational operations of the dial selector, the dial selector functions as a component through which the category(ies) and the item(s) are selected to narrow down the marks. Therefore, a user-friendly operation can be achieved. As a result, the operability can be improved.

The categories and the items may become unselectable after a given period of time since last time the dial selector is operated.

With the above configuration, a performable timing of the narrowing-down operation of the marks is limited to within the given time period since the last time the dial selector is operated, and thus a possibility of narrowing down the marks by a false operation of the dial selector can be reduced.

BRIEF DESCRIPTION OF THE DRAWING(S)

The present disclosure is illustrated by way of example and not by way of limitation in the figures of the accompanying drawings, in which like reference numerals indicate like elements and in which:

FIG. 3 is a table illustrating a specific example of contents regarding marks and stored in a memory;

DETAILED DESCRIPTION

Figure 1:
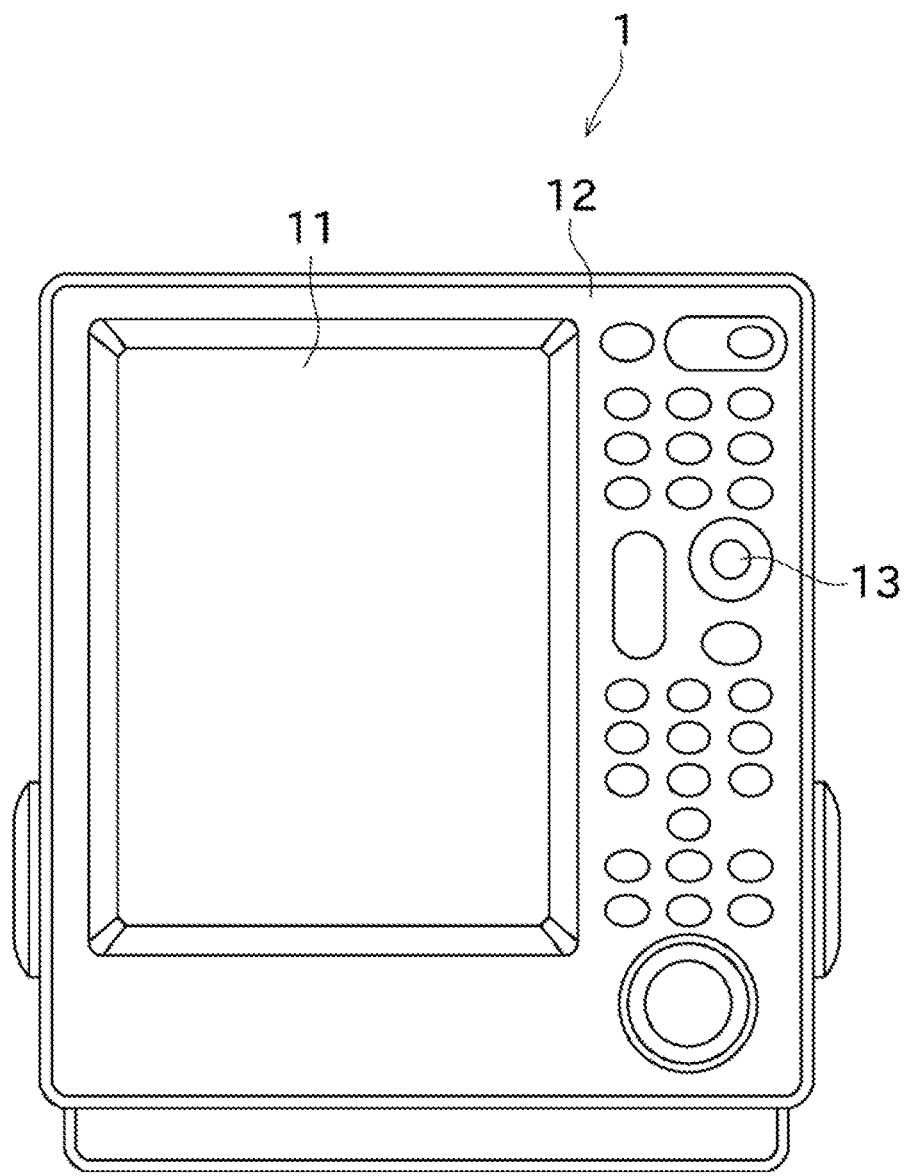
FIG. 1 is an elevational view of a mark display unit for ship navigation according to one embodiment of this disclosure.
Figure 2:
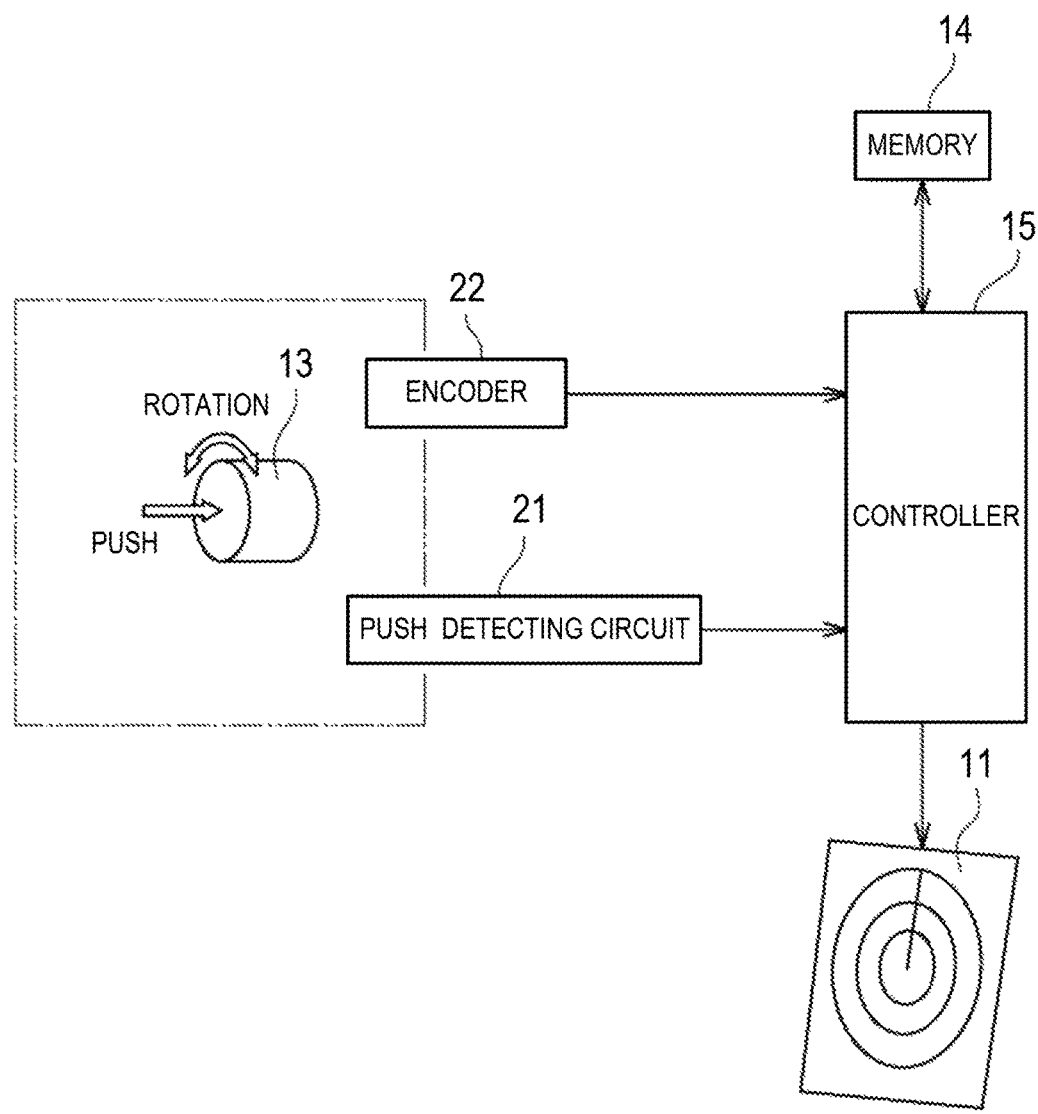
FIG. 2 is a view illustrating a substantial part of an electric configuration and a configuration of a dial selector, both provided to the mark display unit for ship navigation.
Figure 4:
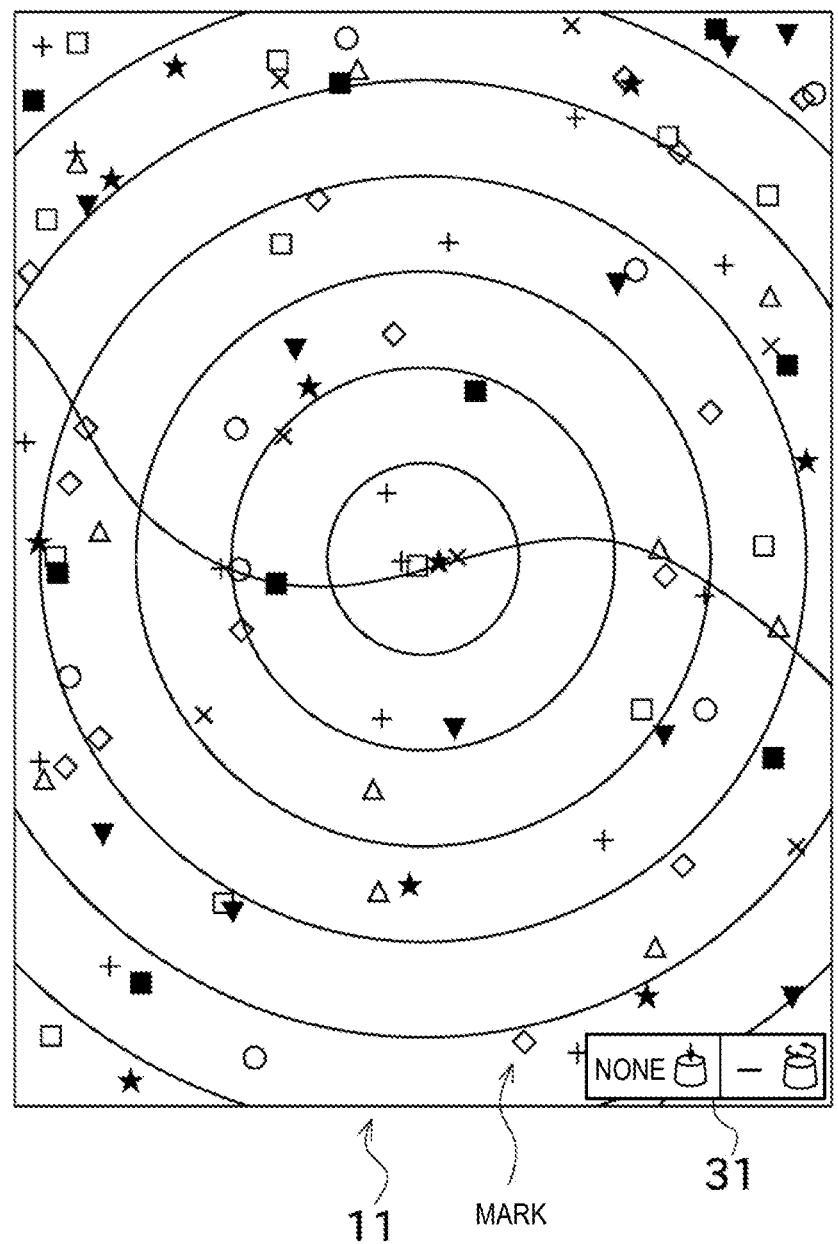
FIG. 4 is a schematic view illustrating displayed contents on a display screen displaying all of marks stored in the mark display unit.
Figure 5:
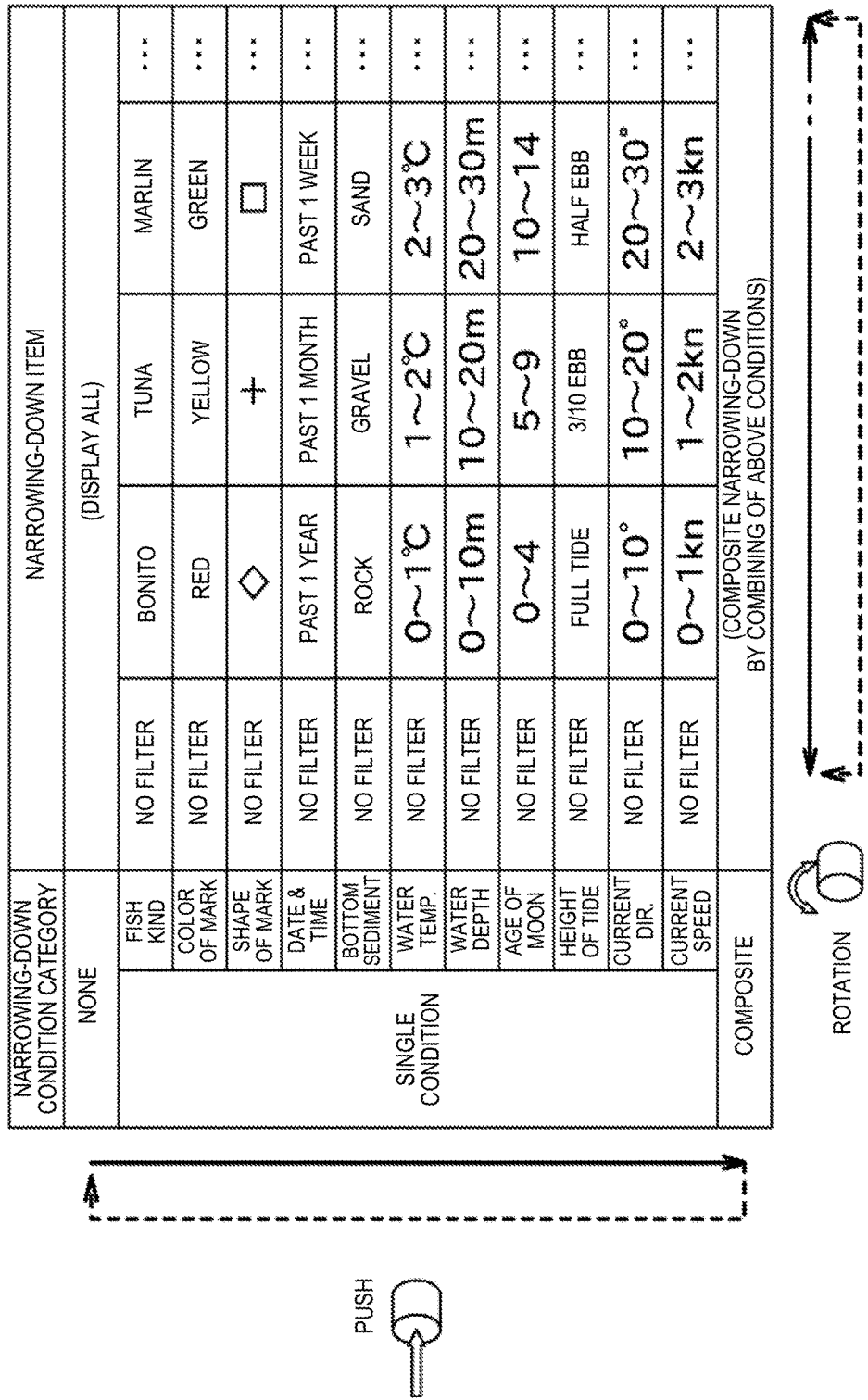
FIG. 5 is a table illustrating a specific example of lists of properties and elements which can be selected by the dial selector, when narrowing down marks.

Next, one embodiment of this disclosure is described with reference to the accompanying drawings. In the following embodiments, an example is illustrated in which the present disclosure is applied to a ship. However, the present disclosure may be applied to any kinds of vehicles having a rudder or a similar steering device, such as other watercrafts including boats, vessels, and submarines, as well as land vehicles, airplanes and spaceships. Therefore, the term "ship" herein refers to one example of the vehicle in the claims. FIG. 1 is an elevational view of a mark display unit 1 for ship navigation according to one embodiment of this disclosure. FIG. 2 is a view illustrating a substantial part of an electric configuration and a configuration of a dial selector 13 with a push function, both provided to the mark display unit 1 for ship navigation. FIG. 3 is a table illustrating a specific example of contents regarding marks and stored in a memory 14. FIG. 4 is a schematic view illustrating displayed contents on a display screen 11 displaying all of marks stored in the mark display unit 1. FIG. 5 is a table illustrating a specific example of lists of properties and elements which can be selected by the dial selector 13, when narrowing down marks.

The mark display unit 1 for ship navigation (ship electronic instrument) illustrated in FIG. 1 displays marks each associated with a position, on a display screen thereof while a ship on which the unit 1 is mounted (hereinafter, may simply be referred to as "the ship") travels. As illustrated in FIGS. 1 and 2, the mark display unit 1 includes the display screen 11, a panel 12, the dial selector 13 with the push function (hereinafter, simply referred to as the dial selector 13), the memory 14, and a controller 15.

The mark display unit 1 has a function to store a specific position as latitude and longitude information, and display it as a mark, at a corresponding position on images of a nautical chart, a radar image, etc. displayed on the display screen 11.

For example, when a fish catch larger than a certain amount is obtained at the specific position while the ship on which the unit 1 is mounted travels, a user can perform a suitable operation to newly register a mark indicating a fishing spot, into the mark display unit 1. Here, the information regarding the position (latitude and longitude) of the mark is stored in the memory 14 of the mark display unit 1 in a form that identifying information (mark ID) for uniquely identifying the mark is assigned thereto. Thus, the mark displayed on the display screen 11 is associated with the position. Note that, positional information can be acquired by a non-illustrated positioning unit (e.g., GNSS positioning device) connected with the mark display unit 1.

With the mark display unit 1 of this embodiment, when or after registering the mark, the user can perform a suitable operation of the mark display unit 1 to store, on top of the information of the position described above, various additional information in association with the mark. Examples of the additional information include information from various points of view, such as a fish kind, a color and shape of the mark, a date and time of the fishing activity, a bottom sediment, a water temperature, a water depth, an age of the moon, a height of tide, a direction of a current, and a flow speed of the current. The additional information may also include information from other points of view (e.g., information regarding a season of the fishing activity and the fish catch). Such additional information is stored in the memory 14.

Note that in the following description, the information (additional information) other than that of the specific position (latitude and longitude) may be expressed as "information assigned to the mark" etc.

The display screen 11 displays the images of the nautical chart, the radar image, etc., and also displays a position of the ship, the trace, the mark, etc. on the images of the nautical chart, the radar image, etc. The display screen 11 is constructed by a liquid crystal display screen, etc.

The panel 12 forms a front face of a housing provided to the mark display unit 1. In this embodiment, the display screen 11 is disposed in a left part of the panel 12 in the elevational view, and various members (including the dial selector 13) configured to control the mark display unit 1 are disposed next to (on the right side of) the display screen 11. Note that, an arrangement of the display screen 11 and the dial selector 13 in the panel 12 can suitably be changed according to the situation.

As illustrated in FIG. 2, the dial selector 13 is capable of a push operation (has the push function) and a rotational operation. The dial selector 13 of this embodiment is a switch having a circular column shape, and is attached to the panel 12 so that an axis thereof extends perpendicular to the panel 12. The dial selector 13 can be pushed in a direction parallel to the axis of the dial selector 13 (a direction toward a back face of the housing), and the dial selector 13 can be rotated in a clockwise direction and a counter-clockwise direction centering on the axis. The user can select a property and element (described later) to narrow down marks displayed on the display screen 11, by controlling the dial selector 13.

The mark display unit 1 includes a push detecting circuit 21 configured to detect the push operation of the dial selector 13. When the push detecting circuit 21 detects the push operation of the dial selector 13, it outputs a detection signal to the controller 15.

Further, the mark display unit 1 includes an encoder 22 configured to detect the rotational operation of the dial selector 13. The encoder 22 has a rotation detecting circuit, and outputs a detection signal to the controller 15 every time the dial selector 13 rotates by a given angle. Thus, the rotation of the dial selector 13 in the clockwise direction and the counter-clockwise direction can be detected at every given angle.

The controller 15 is a processor, such as a CPU configured to read and execute a computer program. The controller 15 controls display modes of the images and the mark(s) displayed on the display screen 11 of the mark display unit 1. As described later, the controller 15 switches the display mode of each mark stored in the memory 14 between "displayed" and "not displayed" on the display screen 11, based on the information acquired from the memory 14.

The memory 14 is configured as a non-volatile memory and stores the information of the position of the mark and the information assigned to the mark. Further the memory 14 stores the property and element selected in association with the operation of the dial selector 13 when narrowing down the mark (described later).

As illustrated in FIG. 3, the memory 14 stores the information of the position (latitude and longitude) of the mark, and the information assigned to the mark, in a form of a table.

As described above, the mark can be assigned with the information from various kinds of points of view. Therefore, with the mark display unit 1, for easier understanding to the user, all of information which are assignable to each mark are designed to have one of properties based on a point of view to which the information is related. Although FIG. 3 simply illustrates some of the properties, in this embodiment, the properties include the fish kind, the color and shape of the mark, the date and time of the fishing activity, the bottom sediment, the water temperature, the water depth, the age of the moon, the height of tide, the direction of the current, and the flow speed of the current.

Each mark can be assigned with information regarding a plurality of properties. Note that a plurality of information having the same property are exclusive of each other, and two or more information having the same property cannot be assigned to a single mark.

When assigning the information to the mark, the user controls the mark display unit 1 to specify the point of view from which the information is obtained (i.e., the property of the information), and then selects or specifies specific contents of the information (hereinafter, the specific contents of the information may be referred to as the "element"). For example, in a case of assigning information "TUNA" to the mark for the fish kind, the user first selects "FISH KIND" as the property, and then specifies "TUNA." Note that the specifiable information is not limited to qualitative information, such as "TUNA" and "RED." For example, in terms of the property "water temperature," quantitative information, such as "22° C.," can be specified.

Selecting or specifying of the element in each property may be performed by an automatic input based on values detected by various sensors connected with the mark display unit 1 (e.g., water temperature sensor, fish finder), instead of the manual work by the user controlling the dial selector 13.

The information assigned to each mark is stored in the memory 14 in the form of the table in FIG. 3, for example. To describe in detail with reference to FIG. 3, regarding the mark of which mark ID is "111," "2014(year)08(month)06(date)-05(hour)35(minute)43(second)" is stored for the property "DATE & TIME," "BONITO" is stored for the property "FISH KIND," and "20° C." is stored for the property "WATER TEMP."

Among the properties listed above, the information for the properties "COLOR OF MARK" and "SHAPE OF MARK" are essential, and the information for those properties is always stored in the memory 14, for every mark. Therefore, the information assigned to each mark includes information for at least two properties. Note that the input of the information for the other properties is arbitrary.

With the above configuration, the mark display unit 1 displays the images of the nautical chart, the radar image, etc. on the display screen 11, and additionally displays the marks associated with positions, respectively, by superimposing them on the images of the nautical chart, the radar image, etc.

FIG. 4 illustrates a display example of the display screen 11. In FIG. 4, multiple marks are displayed by being superimposed on the radar image. In the example of FIG. 4, all of the marks registered in the mark display unit 1 are displayed without being narrowed down.

As illustrated in FIG. 4, a narrowing-down status window 31 having a small size is displayed by being superimposed on the nautical chart, the radar image, etc., at an arbitrary position near an end of the display screen 11 (lower right corner in FIG. 4). When the user performs an operation for narrowing down the marks, the narrowing-down status window 31 can display a narrowing-down condition (specifically, a narrowing-down condition category and a narrowing-down item described later) selected in the narrowing-down operation.

Next, the operation of the dial selector 13 when narrowing down the marks is described with reference to FIG. 5.

With the mark display unit 1 of this embodiment, the marks can be narrowed down to mark(s) assigned with information same as that selected by the user through the operation of the dial selector 13 (e.g., "TUNA"). Thus, it can be prevented that the marks are displayed crowdedly. Additionally, the marks are displayed in the organized shapes according to the user's intension, and therefore, the user can easily utilize the displayed contents. In selecting the information to be narrowed down to, similar to when assigning the information to the marks, the property of the information is first selected and then a specific content of the information is selected.

In this embodiment, the property is selected by the push operation of the dial selector 13 (see the table of FIG. 5). Specifically, every time the dial selector 13 is pushed once, the property switches cyclically in an order of "FISH KIND," "COLOR OF MARK," "SHAPE OF MARK," "DATE & TIME," "BOTTOM SEDIMENT," "WATER TEMP.," "WATER DEPTH," "AGE OF MOON," "HEIGHT OF TIDE," "CURRENT DIR.," and "CURRENT SPEED." In a state where one of the properties described above is selected, by selecting specific information (element) regarding the property (through the rotational operation of the dial selector 13 described later), the mark display unit 1 can be instructed to display only the marks assigned with the information. Note that, by the push operation of the dial selector 13, other than the switching among the properties described above, the narrowing-down status of the marks can also be switched to "NONE" indicating that the narrowing-down operation is not performed, and "COMPOSITE" indicating that the narrowing-down operation is performed with composite conditions. In the following description, "NONE," "COMPOSITE," and the properties "FISH KIND" etc., may comprehensively be referred to as the narrowing-down condition categories or simply as the categories.

In the state where one of the properties (e.g., "FISH KIND") is selected as the narrowing-down condition category, information (element) used in the narrowing-down operation among the information regarding the property concerned can be switched by the rotational operation of the dial selector 13. Note that, in a factory default setting, "NO FILTER" indicating that the narrowing-down operation is not performed in the corresponding property, is selected for all the properties. In the following description, "NO FILTER" and the elements "TUNA" etc., may comprehensively be referred to as the narrowing-down items or simply as the items. With this configuration, for example, in the state where the property "FISH KIND" is selected as the narrowing-down condition category by the push operation of the dial selector 13, by rotating the dial selector 13 in the clockwise direction, the item is switched cyclically in an order of "NO FILTER," "BONITO," "TUNA," "MARLIN," . . . . Note that, when the dial selector 13 is rotated in the counter-clockwise direction, the order of switching the items is reversed.

As described above, by rotating the dial selector 13, one of the items corresponding to the elements assigned to the properties and used in the narrowing-down operation (e.g., "BONITO," "TUNA" and "MARLIN"), and the item which is not used for the narrowing-down operation with any of the elements ("NO FILTER") can be selected. Note that the case where the narrowing-down operation is not performed with any of the elements in the property concerned ("NO FILTER" is selected) is substantially the same as a case where all marks assigned with the property are selected to be displayed.

The elements (items) selectable by the rotational operation of the dial selector 13 vary according to the property selected as the narrowing-down condition category. Further, for the quantitative information, such as the water temperature and the water depth, a plurality of value ranges are prepared in advance as elements (items) thereof, and one of the value ranges as the elements can be selected by the rotational operation of the dial selector 13.

Note that, regardless of any property selected as the narrowing-down condition category, the item "NO FILTER" is included in the selectable items. Thus, according to the situation, the marks can be displayed without the narrowing-down operation (for the property concerned), which increases convenience.

Note that, when one of "NONE" and "COMPOSITE" is selected as the narrowing-down condition category, since the element (item) to be selected does not substantially exist, the rotational operation of the dial selector 13 is invalid.

Figure 6:
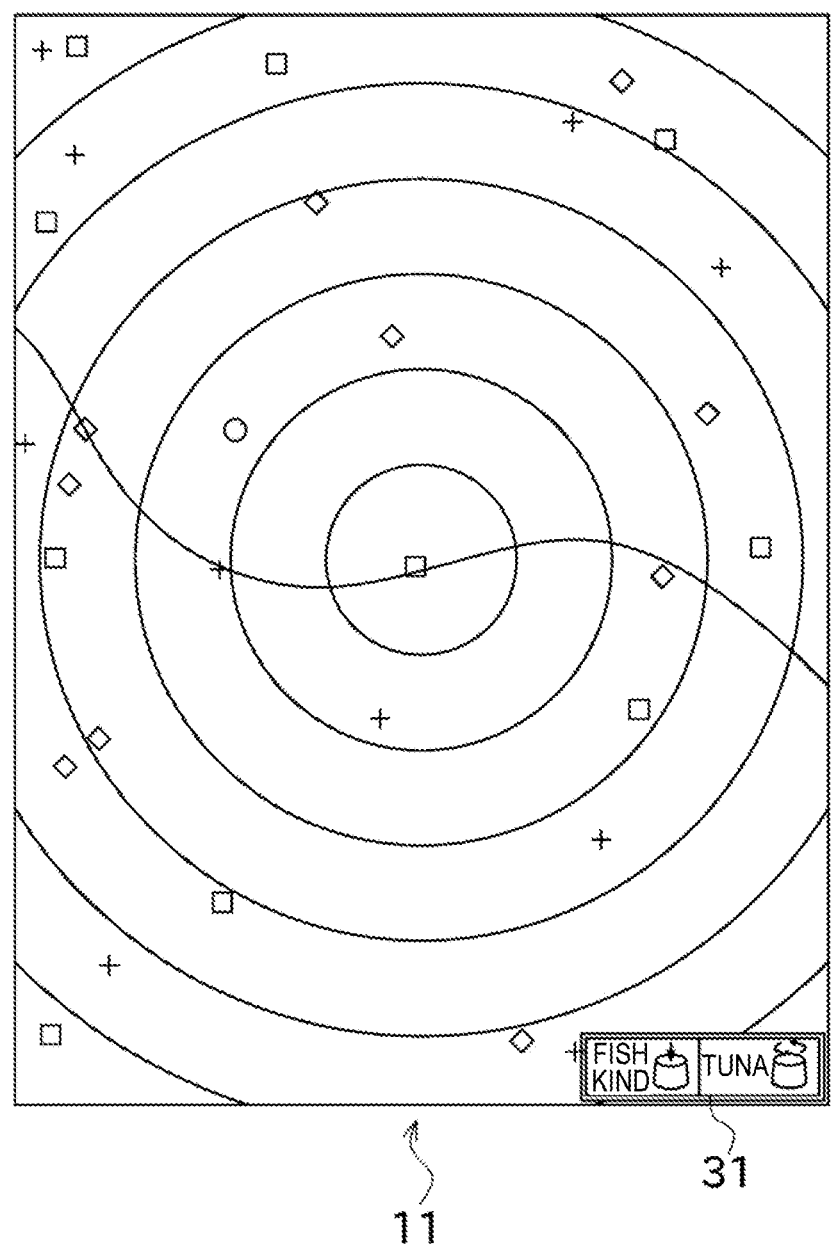
FIG. 6 is a schematic view illustrating the display screen when "TUNA" is selected for a fish kind, when narrowing down marks.

FIG. 6 illustrates a state where the user pushes the dial selector 13 once to shift from the state of FIG. 4 to a mode for narrowing down the marks, pushes the dial selector 13 a few times more to select the property "FISH KIND," and then rotates the dial selector 13 to select the element "TUNA." As a result, the marks are narrowed down only to the marks assigned with the information "TUNA."

Figure 7:
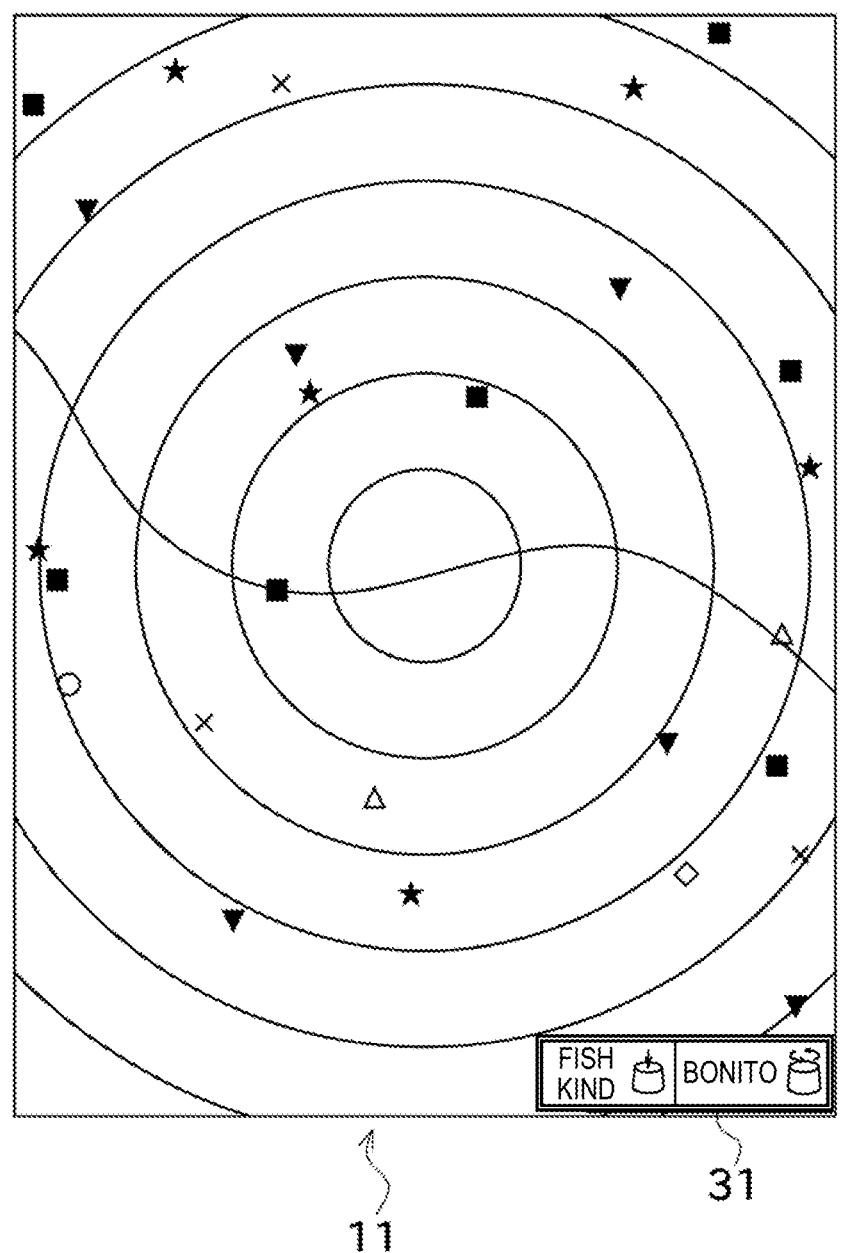
FIG. 7 is a schematic view illustrating the display screen when the dial selector is rotated from the state of FIG. 6 and "BONITO" is selected for the fish kind.

FIG. 7 illustrates a state where the dial selector 13 is rotated more from the state of FIG. 6 and "BONITO" is selected. By this operation, the narrowing-down operation of the marks with "TUNA" is canceled, and the marks are narrowed down to the marks assigned with the information "BONITO." Since the narrowed-down display contents switch in real time simply by the rotational operation of the dial selector 13, an instinctive operation can be achieved.

Figure 9:
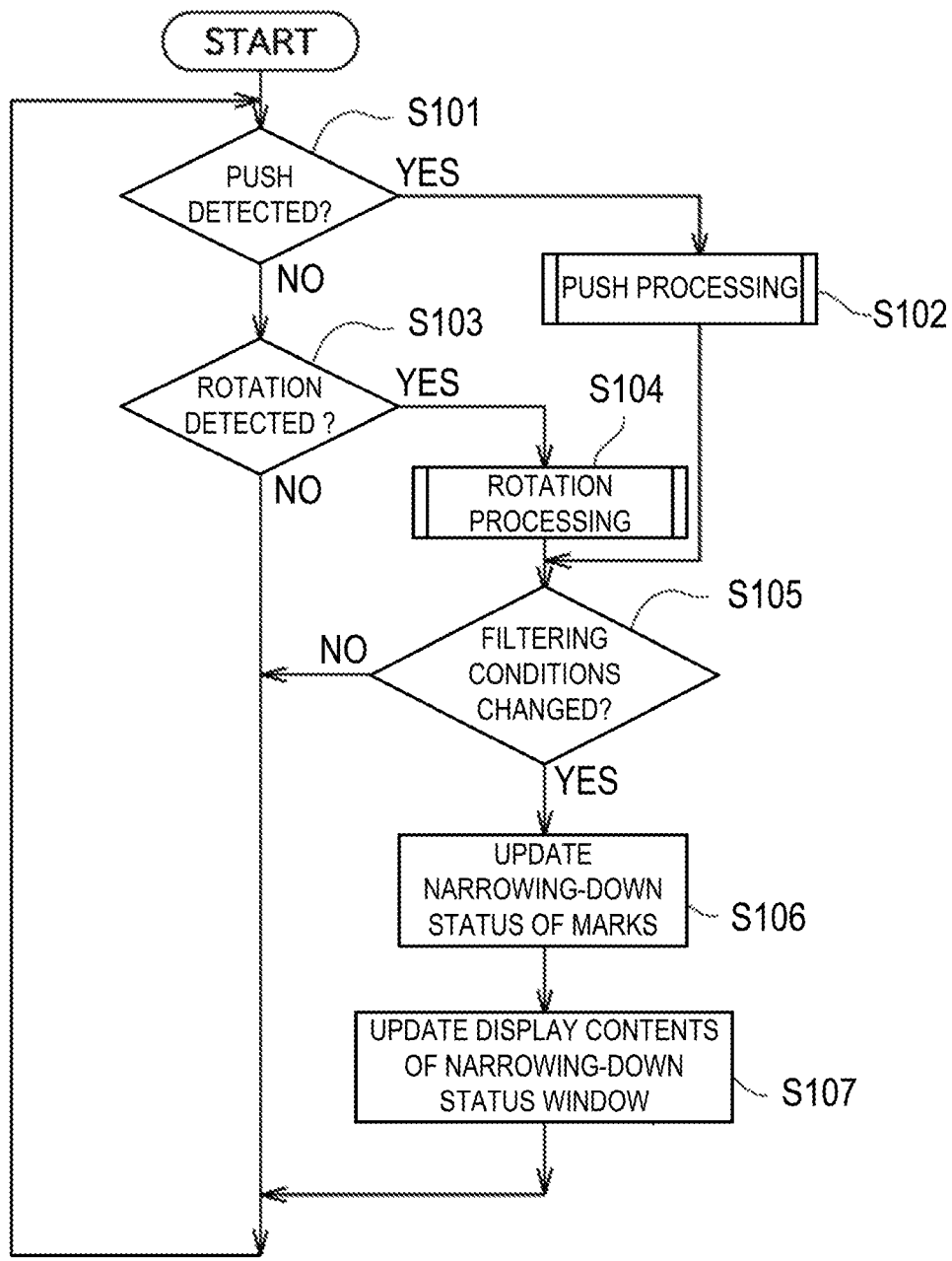
FIG. 9 is a flowchart illustrating narrowing-down processing of the marks according to an operation of the dial selector.
Figure 10:
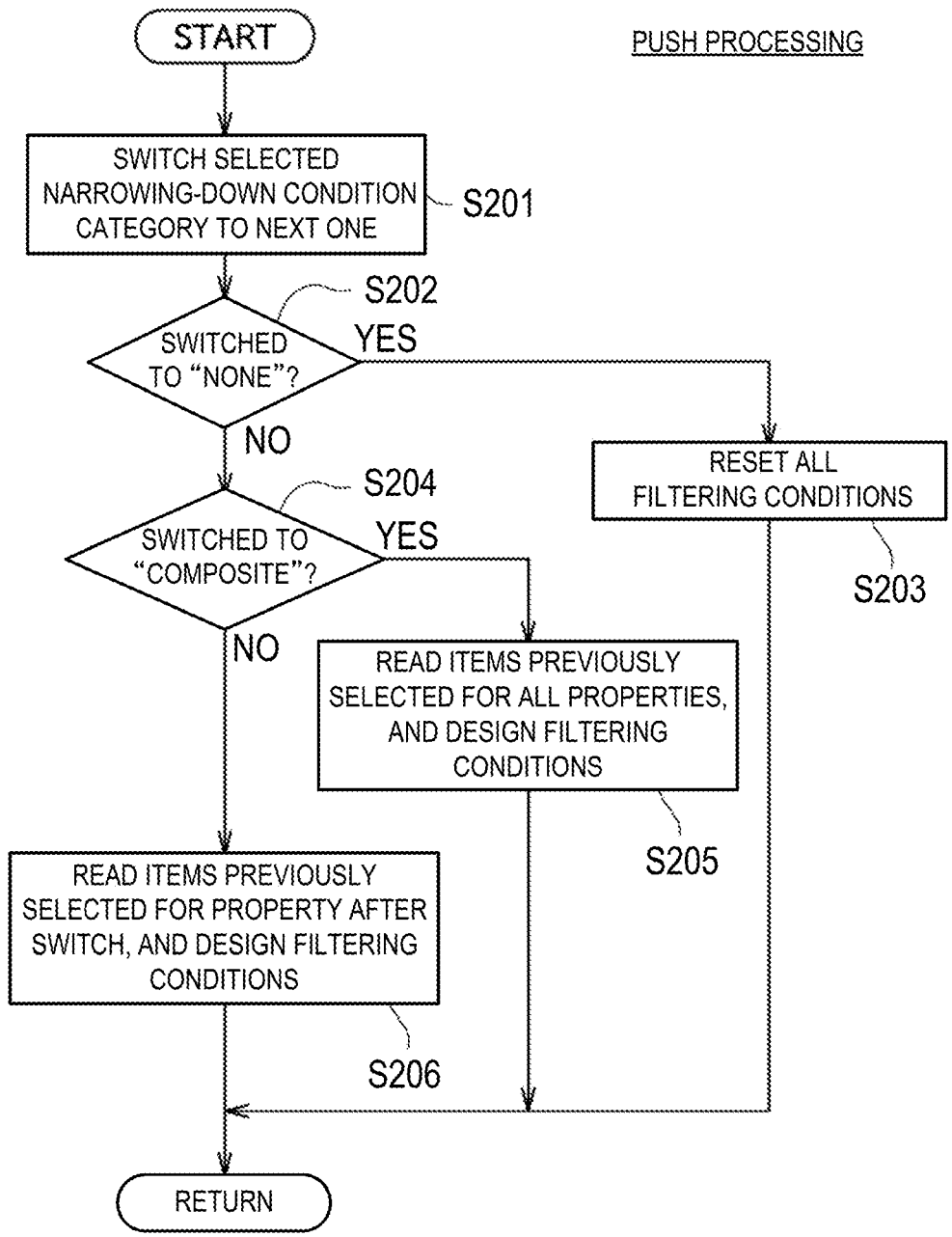
FIG. 10 is a flowchart illustrating a subroutine of pushing processing in FIG. 9.
Figure 11:
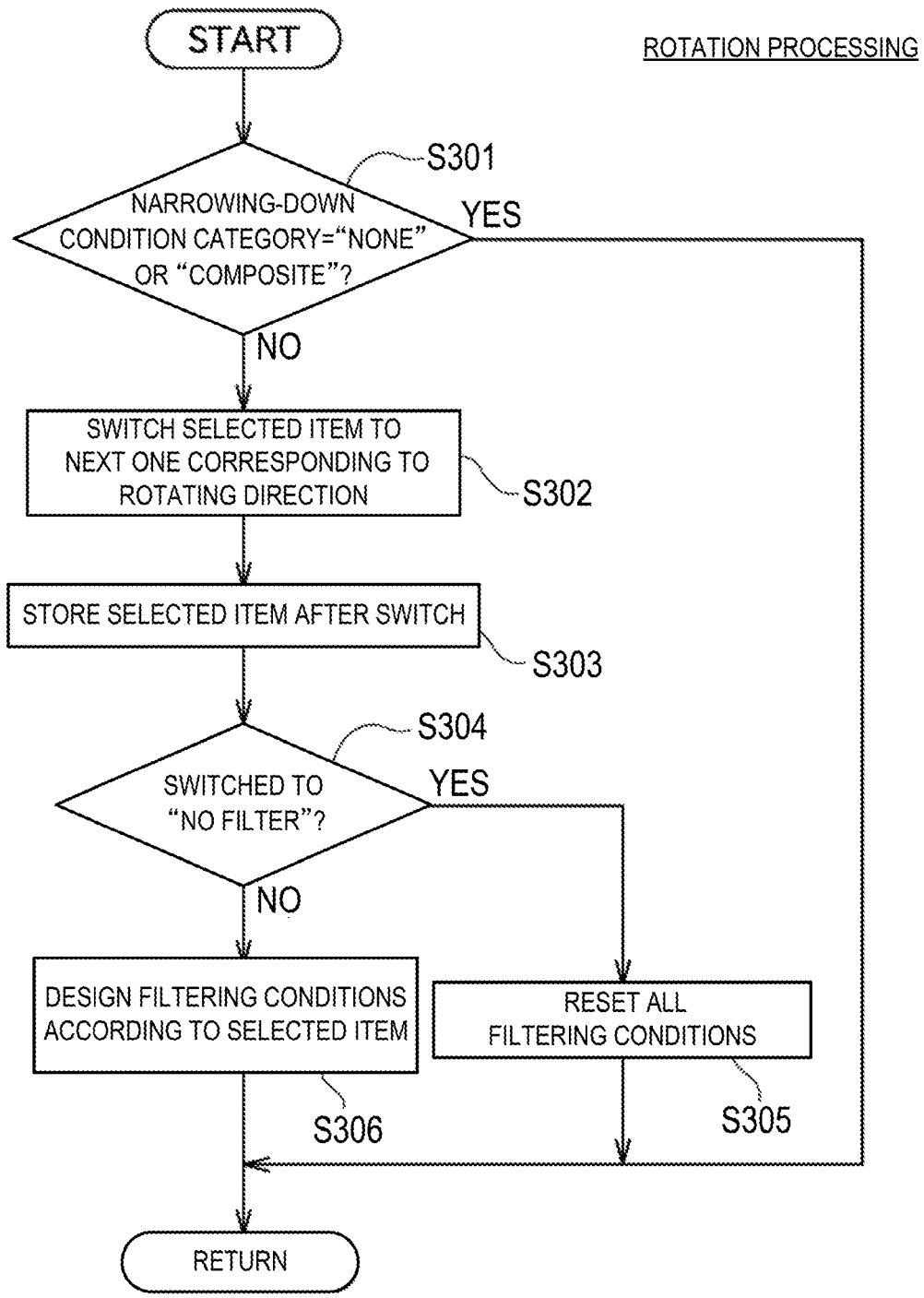
FIG. 11 is a flowchart illustrating a subroutine of rotation processing in FIG. 9.

Next, a series of processings of narrowing down the marks displayed on the display screen 11 of the mark display unit 1, by selecting the property and element through the operation of the dial selector 13, are described in detail with reference to FIGS. 9 to 11. FIG. 9 is a flowchart illustrating processing of narrowing down the marks according to the operation of the dial selector 13. FIG. 10 is a flowchart illustrating a subroutine performed in response to the push operation of the dial selector 13. FIG. 11 is a flowchart illustrating a subroutine performed in response to the rotational operation of the dial selector 13.

First, an operation of causing the narrowing-down operation of the marks is described. Specifically, in the state of FIG. 4 in which the marks are simply displayed along with the radar image etc. on the mark display unit 1, the property and element which are used for the narrowing-down operation are not selectable by the dial selector 13. By the user performing one of the push operation and the rotational operation of the dial selector 13, the mode in which the narrowing-down operation is available (hereinafter, may be referred to as "the narrowing-down mode") is applied, and the main routine illustrated in FIG. 9 is executed. Thus, a user-friendly operation can be achieved.

Figure 8:
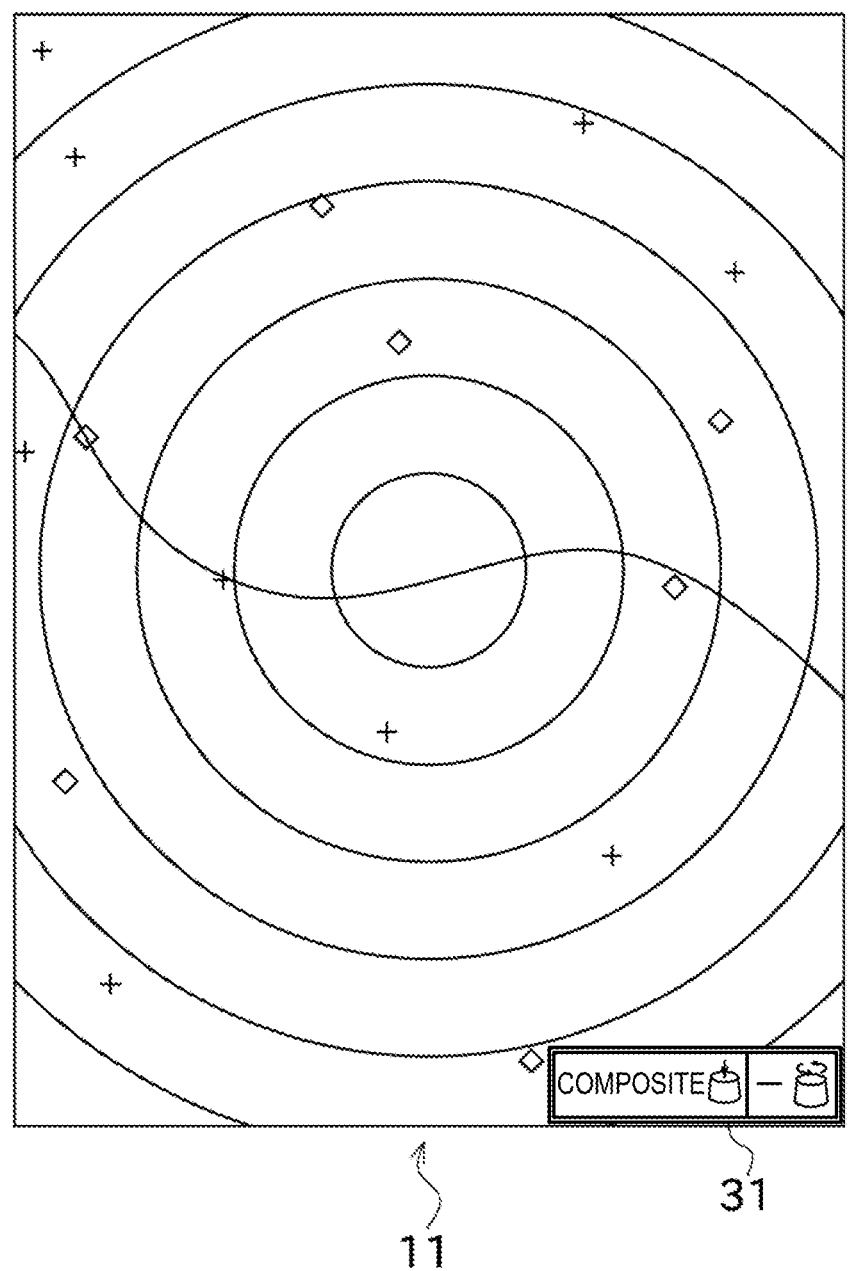
FIG. 8 is a schematic view illustrating the display screen when a composite narrowing-down mode is selected, when narrowing down the marks.

When the narrowing-down mode is applied, the narrowing-down status window 31 described above is displayed by being highlighted so as to notify the user the mode application in an easily understandable manner. The mode of the highlighted display is arbitrary and, specifically, a frame of the window may blink or the frame of the window is displayed in a different color from the normal state described above, for example. Note that, from FIGS. 6 to 8, for the sake of convenience on the drawings, the highlighted display is expressed by illustrating the window frame by double lines.

As illustrated in FIG. 9, first the controller 15 determines whether the push operation of the dial selector 13 is performed (S101). If the push operation of the dial selector 13 is performed, the controller 15 executes push processing in the subroutine (S102). Note that, the push processing is illustrated in FIG. 10 and the description thereof is given later.

In the determination at S101, if the push operation is not performed, the controller 15 determines whether the rotational operation of the dial selector 13 is performed (S103). If the rotational operation of the dial selector 13 is performed, the controller 15 executes rotation processing in the subroutine (S104). Note that, the rotation processing is illustrated in FIG. 11 and the description thereof is given later.

After one of the push processing and the rotation processing is executed, the controller 15 determines whether filtering conditions (the narrowing-down condition category and the narrowing-down item) are changed (S105). If the filtering conditions are changed, the controller 15 updates the narrowing-down status of the marks (S106) and updates the display contents of the narrowing-down status window 31 (S107) according to the new filtering conditions, and then returns to S101. In the determination at S105, if the filtering conditions are not changed, the routine returns to S101.

Thus, since the narrowing-down status of the marks is updated corresponding to the push processing and the rotation processing, high operability with which the narrowing-down status of the marks changes in real time by the operation of the dial selector 13 can be achieved.

Note that, although it is not specifically illustrated in FIG. 9, when neither the push operation nor the rotational operation of the dial selector 13 is performed for a given period of time, the flow of FIG. 9 is terminated and the narrowing-down mode is ended. Thus, a performable timing of the narrowing-down operation of the marks by the dial selector 13 is limited to within a given period of time since last time the dial selector 13 is operated. Therefore, a possibility of narrowing down the marks by a false operation of the dial selector 13 can be reduced.

Next, the subroutine of the push processing which is executed when the push operation of the dial selector 13 is performed is described in detail. Once the subroutine of the push processing illustrated in FIG. 10 is started, the controller 15 switches the selected narrowing-down condition category to a next category in the order described above (S201). Thus, the selected narrowing-down condition category is switched, when it is "NONE," to "FISH KIND," when it is "FISH KIND," to "COLOR," . . . , and when it is "COMPOSITE," to "NONE" (see FIG. 5).

Further, the controller 15 determines whether the switched narrowing-down condition category is "NONE" (S202). If the narrowing-down condition category is switched to "NONE" at S201, the filtering conditions are all reset (S203) so as to display all the marks. Note that, the reset of all the filtering conditions does not mean deleting contents of selected items stored in the memory 14 at S303 described later. Then, the subroutine is ended.

If the switched narrowing-down condition category is not "NONE" as a result of the determination at S202, the controller 15 determines whether the switched narrowing-down condition category is "COMPOSITE" (S204). If the narrowing-down condition category is switched to "COMPOSITE" at S201, and when the selected items are already stored in the memory 14 by an immediately previous operation of the dial selector 13 (the selected items stored at S303 described later), the selected items are read for all the properties, and the filtering conditions are designed so that only marks assigned with all the selected items are displayed (S205). Thus, the composite narrowing-down operation of the marks is achieved. Specifically, the displaying of only the marks matching the selected plurality of conditions becomes available (see FIG. 8). Then the subroutine is ended.

If the switched narrowing-down condition category is not "COMPOSITE" as a result of the determination at S204, it is considered that the narrowing-down condition category is switched to one of the properties (e.g., "FISH KIND") at S201. Therefore, when the selected items are already stored in the memory 14 by the immediately previous operation of the dial selector 13 (the selected items stored at S303 described later), the controller 15 reads the selected item for the property concerned, and the filtering conditions are designed so that only mark(s) assigned with the selected item are displayed (S206). Thus, the narrowing-down operation of the marks with a single condition is achieved. Then the subroutine is ended.

Next, the rotation processing executed when the rotational operation of the dial selector 13 is performed is described in detail. Once the subroutine of the rotation processing illustrated in FIG. 11 is started, the controller 15 determines whether the current narrowing-down condition category is one of "NONE" and "COMPOSITE" (S301). If it is one of "NONE" and "COMPOSITE," the subroutine is ended without executing any processing in response to the rotational operation.

If the narrowing-down condition category is neither "NONE" nor "COMPOSITE" as a result of the determination at S301 (i.e., the narrowing-down condition category is one of the properties (e.g., "FISH KIND")), the controller 15 switches cyclically the selected item to a next item in the narrowing-down condition category concerned in the order described above corresponding to the rotating direction of the dial selector 13 (S302). Thus, for example in the case where the narrowing-down condition category is "FISH KIND," when the dial selector 13 is rotated in the clockwise direction, the selected item is switched, when it is "NO FILTER," to "BONITO," when it is "BONITO," to "TUNA," . . . (see FIG. 5). Note that when the dial selector 13 is rotated in the counter-clockwise direction, the order of switching the item is reversed.

Then the controller 15 stores the selected item after the switch, in the memory 14 (S303). The memory 14 stores a latest selected item (item selected in the immediately previous operation of the dial selector 13) for each property. In the current routine, the selected item after the switch is stored in the memory 14 for the one of the properties. The contents stored in the memory 14 are used at S205 and S206 described above.

Next, the controller 15 determines whether the switched item is "NO FILTER" (S304). If the item is switched to "NO FILTER" at S302, the filtering conditions are all reset (S305) so as to display all the marks. Note that, the reset of all the filtering conditions does not mean deleting the contents of the selected items stored in the memory 14 at S303. Then, the subroutine is ended.

If the selected item after the switch is other than "NO FILTER" as a result of the determination at S304, the filtering conditions are designed according to the selected item (S306). Specifically, when the narrowing-down condition category is one of the properties (e.g., "FISH KIND"), the filtering conditions are designed so that only mark(s) assigned with the element selected for the property concerned (e.g., "TUNA") are displayed. Note that in this case, the narrowing-down operation is not performed in the rest of the properties (the narrowing-down operation with a single condition is performed). Then, the subroutine is ended.

As above, with the mark display unit 1 of this embodiment, by simply rotating the dial selector 13 in the state where the property of request is selected, as illustrated in FIGS. 6 and 7, the narrowing-down status of the marks can be changed in real time. Thus, an instinctive operation with high operability can be achieved.

Further the memory 14 is capable of storing the latest selected element for each property. For example, when the selected property is switched to "FISH KIND" by the push operation of the dial selector 13 and if the element "TUNA" is selected in the immediately previous operation for the property "FISH KIND," by the controller 15 reading the stored contents of the memory 14 at S206, the latest selected element "TUNA" is automatically selected. Accordingly, the narrowing-down status of the marks is also automatically updated to the marks assigned with the element "TUNA." Thus, in a case where the user selects the same property ("FISH KIND") again, without selecting the item selected previously ("TUNA") again from the elements ("BONITO," "TUNA," "MARLIN," . . . ), a result narrowed down to the specific element ("TUNA") can be displayed on the display screen 11. Therefore, even higher usability can be achieved.

When the selected property is switched to "COLOR" by the push operation of the dial selector 13, regardless of any items selected in the immediately previous operation for the other properties (e.g., "FISH KIND"), the controller 15 displays only mark(s) assigned with the element selected for the property "COLOR" (e.g., "RED"). Thus, the property used for narrowing down the marks can easily be switched. As a result, a simple operation system focusing on the narrowing-down operation with a single condition can be achieved and the operability can be improved.

Further, when "COMPOSITE" is selected as the narrowing-down condition category by a given number of times of push operations of the dial selector 13, the composite narrowing-down operation of the marks by using the items selected in the immediately previous operations for the respective properties can be performed. For example, in a case of displaying only the marks assigned with both of the information "BONITO" as the fish kind and "2-3° C." as the water temperature, first, the dial selector 13 is pushed a few times to select "FISH KIND" as the narrowing-down condition category (property) and the dial selector 13 is rotated to select "BONITO." Next, the dial selector 13 is pushed a few times to select "WATER TEMP." as the narrowing-down condition category (property) and the dial selector 13 is rotated to select "2-3° C." Then, the dial selector 13 is pushed a few times to select "COMPOSITE" as the narrowing-down condition category. Thus, with the mark display unit 1 of this embodiment, the composite narrowing-down operation can easily be performed by the user pushing the dial selector 13 a few times. Therefore, the marks are less likely displayed densely, which increases convenience.

Next, the narrowing-down status window 31 is described. In the narrowing-down status window 31, the currently selected narrowing-down condition category and item are displayed. For example, in the example of FIG. 6, a case where "FISH KIND" is selected as the narrowing-down condition category (property) and "TUNA" is selected as the item (element) is illustrated. With this configuration, when the push and rotational operations of the dial selector 13 are performed and the filtering conditions are changed, the narrowing-down status of the marks is updated and the displayed contents in the narrowing-down status window 31 is updated.

In the narrowing-down status window 31, an icon indicating the push operation of the dial selector 13 is displayed near the displayed narrowing-down condition category ("FISH KIND"), and an icon indicating the rotational operation of the dial selector 13 is displayed near the displayed item ("TUNA"). Thus, the user can easily understand the operation of the dial selector 13 regarding the narrowing-down operation of the mark.

Here, in the narrowing-down status window 31, the currently selected narrowing-down condition category (property) and item (element) are displayed, and the other narrowing-down condition categories (properties) and items (elements) are not displayed. For example, in the example of FIG. 6, "FISH KIND" which is the currently selected narrowing-down condition category (property) is displayed in the narrowing-down status window 31, whereas "COLOR," "SHAPE," . . . , "NONE," and "COMPOSITE" which are other narrowing-down condition categories are not displayed. Further in the example of FIG. 6, "TUNA" which is the currently selected item (element) is displayed in the narrowing-down status window 31, whereas "BONITO," "MARLIN," . . . , and "NO FILTER" which are other items are not displayed. With this configuration, compared to a user interface in which lists of properties and items are displayed for the user to select, by simplifying the displayed operation contents, the narrowing-down status window 31 can be reduced in size so as not to occupy much space on the display screen 11. Therefore, even when the narrowing-down status window 31 is displayed on the display screen 11, the narrowing-down status window 31 does not interrupt the user from referring to the nautical chart, the radar image, etc., on the display screen 11.

As described above, the mark display unit 1 of this embodiment is for ship navigation and displays the marks on the display screen 11, each of the marks associated with the position. The mark display unit 1 includes the dial selector 13 and the controller 15. In response to switching of a currently selected element by the rotation of the dial selector 13, the controller 15 immediately switches the display mode of each mark between the displayed mode and the not non-displayed mode, so as to display, at a corresponding position on the display screen 11, only one or more of the marks assigned with the element selected by the dial selector 13. In the example of this embodiment, as it can be understood by comparing the state of FIG. 6 where "TUNA" is selected as the element with the state of FIG. 7 where the selected element is switched to "BONITO" by the rotational operation of the dial selector 13, the narrowing-down status is switched sequentially and immediately as the dial selector 13 is rotated.

Thus, even when the number of marks stored in the mark display unit 1 is increased, for example, by the user registering a fishing spot, a situation where the chart etc. displayed on the display screen 11 are covered by the marks and cannot be seen, or a situation where the marks are displayed densely and the individual marks are difficult to visually be recognized, can be reduced. Further, the mark display unit 1 may include a touch panel so that the user, by touching a mark on the display screen 11, can select the mark and perform various settings and operations thereon. In this case, by applying the configuration of this embodiment, a situation where marks are displayed densely and difficult to select can be reduced. Thus, visibility of the display screen 11 of the mark display unit 1 can be secured. Further, the user can select a narrowing-down status while looking at the narrowed-down marks change sequentially corresponding to the rotational operation of the dial selector 13, and therefore, high usability can be achieved and the operability can be improved.

Although the embodiment of this disclosure is described above, the above configuration may be modified as follows, for example.

In this embodiment, the dial selector 13 is configured as a switch having the circular column shape; however, the specific shape of the dial selector 13 may suitably be changed as long as it is capable of performing a push operation and a rotational operation. For example, the dial selector may include a rotary indicator and a push button disposed in a center part thereof. Further the dial selector may be a job dial. Alternatively, the dial selector may have a configuration such as that of a wheel (that is capable of performing a push operation) of a mouse, which is well-known as a pointing device for a computer.

The properties and elements assigned to the operations of the dial selector 13 in this embodiment are described merely as an example, and the kinds, numbers and orders of the properties and elements may suitably be changed.

In this embodiment, the controller 15 of the mark display unit 1 displays the marks on the display screen 11, in response to the operation of the dial selector 13. However, a controller (display controller) configured to control the display screen may be provided independently from the controller of the main body, and the display controller may perform the control of displaying the marks on the display screen 11.

The reset of all the filtering conditions may be adjusting the elements for all the properties to "NO FILTER" by a suitable operation, which improves the convenience even more.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed. Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A mark display unit for ship navigation, the mark display unit displaying marks on a display screen, each of the marks associated with a geographical position, comprising:

a dial selector with a push function, a push operation of the dial selector being associated with selecting one of a plurality of categories corresponding to a number of push operations, and a rotational operation of the dial selector being associated with selecting one of a plurality of items regarding a selected category corresponding to a rotational position of the dial selector, the plurality of categories and the plurality of items assigned to the marks; and a controller configured to display on the display screen one or more of the marks according to a combination of the number of push operations and the rotational position of the dial selector, wherein the mark display unit is connected to a water temperature sensor and a fish finder, the water temperature sensor being configured to obtain maritime information including a water temperature, the fish finder being configured to obtain maritime information including at least one of a date of a fishing activity, a time of the fishing activity, a bottom sediment, a water depth, a phase of the Moon, and a height of a tide, the maritime information being stored in association with each mark as additional information, wherein the selected item is switched among the plurality of items in association with the rotational operation of the dial selector, and as the selected item is switched, the controller displays one or more of the marks assigned with the item selected by the dial selector, each of the one or more of the marks being displayed at a corresponding position on the display screen, wherein a narrowing-down operation is selectably performed to selectively display one or more of the marks assigned with the item selected for the property indicated by the dial selector in a displayed mode, and not display one or more marks not assigned with the item selected by the dial selector in a non-displayed mode, and wherein the controller further displays, on the display screen, a window in which one of the categories and one of the items currently selected are displayed, and a remainder of the categories and a remainder of the items that are currently not selected are not displayed.

2. The mark display unit for the ship navigation of claim 1, wherein in a case where the one of the categories is selected again in association with latest push and rotational operations, the controller displays, on the display screen, one or more of the marks assigned with an item selected in association with immediately previous push and rotational operations for the one of the categories, without selecting the item again, each of the one or more of the marks displayed at the corresponding position on the display screen.

3. The mark display unit for the ship navigation of claim 1, wherein the items from which one item is selected in association with the rotational operation of the dial selector include an item that causes the controller to display all the marks assigned with the selected category.

4. The mark display unit for the ship navigation of claim 1, wherein the controller only displays, on the display screen, one or more of the marks assigned with an item selected in a category currently selected, while the item is selected by the dial selector regardless of any items previously selected in categories other than the selected category, each of the one or more of the marks displayed at the corresponding position on the display screen.

5. The mark display unit for the ship navigation of claim 1, wherein the categories from which one category is selected in association with the push operation of the dial selector include a category that causes the controller to display one or more of the marks matching a plurality of selected conditions.

6. The mark display unit for the ship navigation of claim 1, wherein the window is displayed on the display screen along with one or more of the marks assigned with the one of the categories and the one of the items that are currently selected.

7. The mark display unit for the ship navigation of claim 1, wherein while the categories and the items are selectable by the dial selector, the controller displays the window in a highlighted manner.

8. The mark display unit for the ship navigation of claim 1, wherein when the categories and the items are unselectable, the categories and the items become selectable in association with one of the push and rotational operations of the dial selector.

9. The mark display unit for the ship navigation of claim 1, wherein the categories and the items become unselectable after a given period of time since last time the dial selector is operated.

10. The mark display unit for the ship navigation of claim 2, wherein the items from which one item is selected in association with the rotational operation of the dial selector include an item that causes the controller to display all the marks assigned with the selected category.

11. The mark display unit for the ship navigation of claim 10, wherein the controller only displays, on the display screen, one or more of the marks assigned with an item selected in a category currently selected, while the item is selected by the dial selector regardless of any items previously selected in categories other than the selected category, each of the one or more of the marks displayed at the corresponding position on the display screen.

12. The mark display unit for the ship navigation of claim 11, wherein the controller displays, on the display screen, a window in which one of the categories and one of the items that are currently selected are displayed and the rest of the categories and the rest of the items that are currently not selected are not displayed.

13. The mark display unit for the ship navigation of claim 12, wherein the window is displayed on the display screen along with one or more of the marks assigned with the one of the categories and the one of the items that are currently selected.

14. The mark display unit for the ship navigation of claim 13, wherein while the categories and the items are selectable by the dial selector, the controller displays the window in a highlighted manner.

15. The mark display unit for the ship navigation of claim 14, wherein when the categories and the items are unselectable, the categories and the items become selectable in association with one of the push and rotational operations of the dial selector.

16. The mark display unit for the ship navigation of claim 15, wherein the categories and the items become unselectable after a given period of time since last time the dial selector is operated.

17. The mark display unit for the ship navigation of claim 12, wherein while the categories and the items are selectable by the dial selector, the controller displays the window in a highlighted manner.

18. The mark display unit for the ship navigation of claim 10, wherein the categories from which one category is selected in association with the push operation of the dial selector include a category that causes the controller to display one or more of the marks matching a plurality of selected conditions.

19. The mark display unit for the ship navigation of claim 6, wherein while the categories and the items are selectable by the dial selector, the controller displays the window in a highlighted manner.

* * * * *